US007631748B2

(12) United States Patent
Mitchell

(10) Patent No.: US 7,631,748 B2
(45) Date of Patent: Dec. 15, 2009

(54) CONVEYOR SYSTEM

(75) Inventor: Rory M. Mitchell, Beaverton, OR (US)

(73) Assignee: USNR/Kockums Cancar Company, Vancouver, WA (US)

( * ) Notice: Subject to any disclaimer, the term of this patent is extended or adjusted under 35 U.S.C. 154(b) by 380 days.

(21) Appl. No.: 11/326,346

(22) Filed: Jan. 6, 2006

(65) Prior Publication Data

US 2006/0144675 A1 Jul. 6, 2006

Related U.S. Application Data

(60) Provisional application No. 60/641,445, filed on Jan. 6, 2005.

(51) Int. Cl.
*B65G 29/00* (2006.01)

(52) U.S. Cl. ................................ 198/463.1; 198/463.3

(58) Field of Classification Search ................. 144/1.1, 144/3.1, 242.1, 245.1, 245.6, 245.2, 245.4, 144/246.1, 248.5, 250.25, 253.7, 250.11; 198/463.1, 463.2, 463.3, 373, 465.3, 375, 198/379, 415, 465.1, 597, 809; 83/732, 418
See application file for complete search history.

(56) References Cited

U.S. PATENT DOCUMENTS

| | | | | |
|---|---|---|---|---|
| 1,252,894 | A | 1/1918 | Fitzgerald | |
| 3,621,972 | A | 11/1971 | Reuter | |
| 3,738,404 | A * | 6/1973 | Walker | 144/340 |
| 3,844,399 | A * | 10/1974 | Sellers et al. | 198/624 |
| 3,903,771 | A | 9/1975 | Fritz et al. | |
| 4,078,592 | A * | 3/1978 | Standal | 144/208.5 |
| 4,144,782 | A * | 3/1979 | Lindstrom | 83/102.1 |
| 4,205,568 | A | 6/1980 | Foster | |
| 4,259,907 | A * | 4/1981 | Schuck | 104/48 |
| 4,340,137 | A | 7/1982 | Foster | |
| 4,441,537 | A * | 4/1984 | Vartiainen | 144/357 |
| 4,621,971 | A * | 11/1986 | Ratuio | 414/431 |
| 4,881,584 | A * | 11/1989 | Wislocker et al. | 144/39 |
| 4,907,632 | A * | 3/1990 | Reuter | 144/356 |
| 5,125,497 | A * | 6/1992 | Sundermann | 198/463.3 |

(Continued)

FOREIGN PATENT DOCUMENTS

WO WO 84/02105 6/1984

(Continued)

*Primary Examiner*—Gene Crawford
*Assistant Examiner*—William R Harp
(74) *Attorney, Agent, or Firm*—Schwabe, Williamson & Wyatt

(57) ABSTRACT

A continuous sharp chain conveyor system is disclosed wherein a workpiece may be elevated from the sharp chain conveyor while the workpiece is transported down the sharp chain conveyor such that the workpiece may be rotated to maintain the workpiece in an optimized position. The system includes a sharp chain which engages the workpiece, a first and a second skid positionable parallel alignment with the sharp chain to elevate and lower the workpiece relative to the sharp chain, and pairs of rotatable positioning drive rolls positionable along the sharp chain to rotate the workpiece when the workpiece is elevated. The system may also include a plurality of hold-down rolls to maintain the workpiece on the sharp chain by exerting downward pressure on the workpiece. The pairs of rotatable positioning drive rolls may cooperatively displace the workpiece laterally and/or independently angularly displace the workpiece relative to the longitudinal centreline of the sharp chain.

22 Claims, 5 Drawing Sheets

U.S. PATENT DOCUMENTS

| | | | | |
|---|---|---|---|---|
| 5,385,186 | A | 1/1995 | Head, Jr. et al. | |
| 5,429,161 | A * | 7/1995 | Allard | 144/248.4 |
| 5,649,580 | A * | 7/1997 | Mierau et al. | 144/248.4 |
| 5,676,238 | A * | 10/1997 | Saastamo | 198/502.2 |
| 5,765,617 | A * | 6/1998 | Mierau et al. | 144/387 |
| 5,918,653 | A * | 7/1999 | Knerr | 144/404 |
| 6,062,376 | A * | 5/2000 | Nerenhausen, Sr. | 198/809 |
| 6,105,477 | A | 8/2000 | Olson | |
| 6,176,283 | B1 * | 1/2001 | Knerr | 144/248.4 |
| 6,446,790 | B1 * | 9/2002 | Roberson | 198/692 |
| 6,494,240 | B1 * | 12/2002 | Brisson | 144/357 |
| 6,705,363 | B2 * | 3/2004 | McGehee et al. | 144/357 |
| 6,860,302 | B2 * | 3/2005 | Brisson | 144/382 |
| 6,896,019 | B2 * | 5/2005 | Achard et al. | 144/357 |
| 7,017,632 | B2 * | 3/2006 | Kennedy et al. | 144/357 |
| 2003/0034090 | A1 * | 2/2003 | Brisson | 144/357 |
| 2006/0070859 | A1 * | 4/2006 | Pahlow et al. | 198/809 |

FOREIGN PATENT DOCUMENTS

| | | |
|---|---|---|
| WO | WO 92/81300 | 10/1992 |

* cited by examiner

FLOW
E
30a
30b
65

D
30a
30b
65

B
30
C
30
C
65
A

CONVEYOR SYSTEM

CROSS REFERENCE TO RELATED APPLICATION

This application claims priority from U.S. Provisional Patent Application No. 60/641,445 filed Jan. 6, 2005 entitled Conveyor System.

FIELD OF THE INVENTION

This invention relates to the field of devices for positioning a workpiece in a sawmill, and more particularly, it relates to a system for positioning a workpiece on a sharp chain conveyor system.

BACKGROUND OF THE INVENTION

A workpiece, such as a log or a cant, having a maximum of 30 inches in diameter is typically transported on a sharp chain conveyor system. This is also typically known as a "Single Length Infeed" (SLI) system. Such a sharp chain conveyor system includes a conveyor chain having sharp teeth which extend vertically upwards from the conveyor chain to firmly engage and secure onto the surface of the workpiece. A plurality of parallel spaced apart turning rolls are perpendicular to the direction of flow of the sharp chain conveyor. The turning rolls may be moved vertically to permit an operator to manually rotate the workpiece about its longitudinal axis to a position determined by the operator to be the optimal position. The turning rolls are then lowered so that the workpiece re-engages the sharp teeth of the sharp chain conveyor for transport of the workpiece downstream through a scanner. An optimizer then determines an optimal cutting solution for the workpiece to produce the highest value or yield of lumber.

The manual rotation of the workpiece is a slow and time consuming process as the operator requires time to assess and position the workpiece in the most favorable position. Furthermore, such process may significantly reduce lumber recovery since the positioning of the workpiece by the operator is subject to human error in judgment. Once the operator lowers the workpiece back onto the sharp chain conveyor and the workpiece is transported downstream past the turning rolls, there is no means for repositioning the workpiece. If the operator incorrectly positioned the workpiece such error may compromise the optimal cutting solution determined by the scanner and optimizer, thereby reducing lumber recovery and there is no means of readjusting to correct the position of the workpiece.

To address the shortcomings of the SLI system, a "double Length Infeed" (DLI) system has been developed to eliminate the manual rotation of the workpiece. In place of the operator and turning rolls, the DLI system uses a scanner and optimizer to determine the optimal position of the workpiece and simultaneously, a rotating conveyor rotates the workpiece into such optimized position, thereby eliminating the time required to visually assess and manually rotate the workpiece. The workpiece is then fed onto a second conveyor where it passes through a second scanner and optimizer to determine the optimized cutting solution for the workpiece. On such a second conveyor, the workpiece may be further displaced laterally and angularly relative to its centreline so that the workpiece may be optimally positioned for processing in accordance with the optimized cutting solution. Once the workpiece is optimally positioned, it is fed onto a third conveyor, which is a sharp chain conveyor, to be transported to the primary breakdown sawing machines.

Although the DLI system is capable of positioning the workpiece in its optimized position, the workpiece may be subsequently displaced from its position as the workpiece is transported towards the primary breakdown machines. For example, hold-down rolls which ride along the upper surface of the workpiece to hold the workpiece in place on the conveyor may engage protruding knots or other superficial irregularities on the workpiece surface. Contact with such rough surfaces between the hold-down rolls and protruding knots may result in a displacement of the workpiece from its optimized position.

Furthermore, the workpiece may also be displaced when the workpiece is transported between the multiple conveyors. Distances between successive conveyors may span up to 40 inches and the workpiece may be transported butt first from conveyor to conveyor. Such a butt end, which is typically flared, may initially displace vertically downwards into the unsupported space defined by the span distance and be abruptly raised back onto the conveyor by engaging the succeeding conveyor, thereby disrupting the optimized position of the workpiece. Vertical rolls positioned between the conveyors to grip the workpiece and prevent it from displacing vertically into the void may be provided. However, such rolls may cause undesired movement of the workpiece as well. In addition, because of the length of the DLI system, substantial physical space is required to accommodate such machinery, thereby increasing the cost of production.

Accordingly, there is required a shorter conveyor system capable of positioning and maintaining the optimized position of a workpiece as the workpiece is being transported towards the primary breakdown machines.

SUMMARY OF THE INVENTION

It is an object of the invention to provide a continuous sharp chain conveyor system for transporting a workpiece such that span distances between successive conveyors are eliminated.

It is another object of the invention to provide a sharp chain conveyor system having a single conveyor to reduce the length of the system.

It is another object of the invention to provide a means to elevate the workpiece from the sharp chain conveyor such that the position of the workpiece may be adjusted at anytime while the workpiece is transported down the sharp chain conveyor system.

It is a further object of the invention to provide a continuous means to rotate the workpiece such that the optimized position of the workpiece may be maintained while the workpiece is transported down the sharp chain conveyor system.

The present invention includes or cooperates with a sharp chain conveyor system which includes a sharp chain adapted to engage a first surface of the workpiece. A first and a second skid is positionable in parallel alignment with the sharp chain. The first and the second skid is adapted to displace the workpiece between a lowered first and an elevated second position. A plurality of rotatable positioning drive rolls are positionable along the sharp chain. The plurality of rotatable positioning drive rolls are adapted to rotate the workpiece when the workpiece is displaced by the first and the second skid into the second position. The system may also include a plurality of hold-down rolls pivotally coupled with a frame such that the plurality of hold-down rolls may engage a second surface of the workpiece to maintain the workpiece on the sharp chain by exerting pressure on the workpiece.

The sharp chain may be a continuous chain having a plurality of teeth for engaging the workpiece. The first and second skids may be disposed on either side of the sharp chain such that the sharp chain is interposed between the first and the second skids. To displace the workpiece to the first position, the first and second skids displace vertically downwards relative to the sharp chain such that the workpiece engages the sharp chain. To displace the workpiece to the second position, the first and second skids displace vertically upwards relative to the sharp chain such that the workpiece is elevated and disengages from the sharp chain.

A first wheel may be disposed between a first end of the first and second skid and a second wheel may be disposed between a second end of the first and the second skid. A first through-shaft journals through the first and second skid and the first wheel at a first end and a second through-shaft journals through the first and second skid and the second wheel at a second end. The first and said second wheels are eccentrically mounted on the first and second through-shafts. A member couples the first through-shaft with the second through-shaft such that when a first actuating means rotates the first through-shaft, the member transfers rotational movement of the first through-shaft to rotate the second through-shaft. Such rotational movement of the first through-shaft and the second through-shaft causes the first and second wheel to uniformly displace the first and second skid between the first position and the second position by the cam action of the eccentric wheels bearing down against a rigid bearing surface thereby forcing the skids upwardly.

Pairs of the rotatable positioning drive rolls are positionable along the sharp chain such that one rotatable positioning drive roll from each pair of rotatable positioning drive rolls is positionable on each side of the sharp chain. The rotatable positioning drive rolls are pivotally coupled with the frame such that the pairs of rotatable positioning drive rolls may displace laterally towards and away from a longitudinal centreline of the workpiece and displace angularly relative to the longitudinal centreline of the workpiece. A second actuating means may laterally displace the rotatable positioning drive to engage the workpiece such that the actuating means may cooperatively move the rotatable positioning drive rolls to displace the workpiece laterally relative to the longitudinal centreline of the sharp chain (an offset/slew). Furthermore, second actuating means may also angularly displace one rotatable positioning drive roll of each pair of rotatable positioning drive rolls such that the actuating means may independently move each of the rotatable positioning drive rolls to displace the workpiece angularly relative to the longitudinal centreline of the sharp chain (a skew/slew).

The sharp chain conveyor system cooperates with a scanner and an optimizer processing data from the scanner. The optimizer determines an optimized position for the workpiece. The optimizer is in transmittable communication with the second actuating means to control the pairs of rotatable positioning drive rolls to position the workpiece in the optimized position. The optimizer may also be in transmittable communication with the first actuating means to control the first and second skids to elevate the workpiece to enable the pairs of rotatable positioning drive rolls to position the workpiece in the optimized position.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

FIG. **8*a*** is a plan view of a pair of rotatable positioning drive rolls displacing the workpiece laterally of the flow direction.

FIG. **8*b*** is a plan view of a pair of rotatable positioning drive rolls displacing the workpiece laterally to the right of the longitudinal centreline of the sharp chain as viewed in the flow direction.

FIG. **8*c*** is a plan view of a pair of rotatable positioning drive rolls displacing the workpiece laterally to the left of the longitudinal centreline of the sharp chain as viewed in the flow direction.

Figure 1:
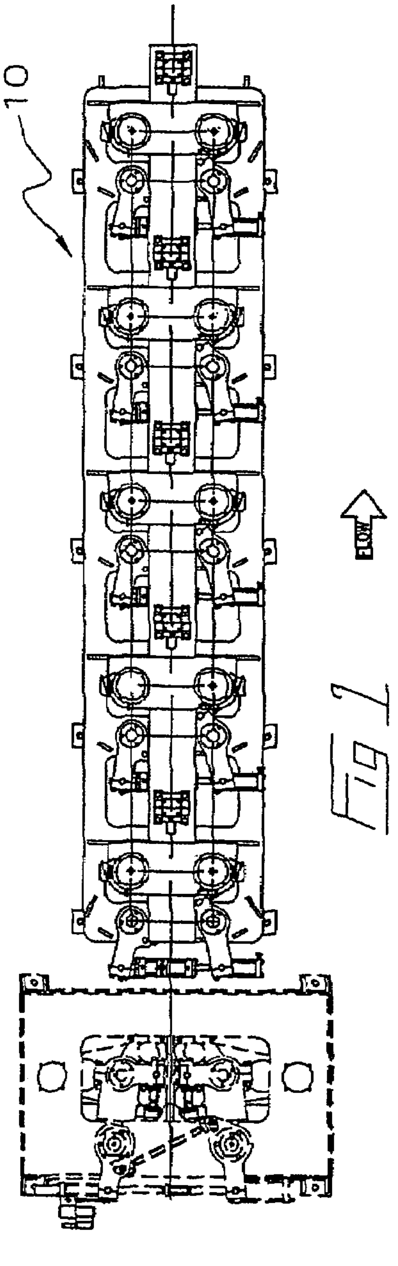
FIG. 1, is a plan view of a sharp chain conveyor system according to the present invention.
Figure 2:
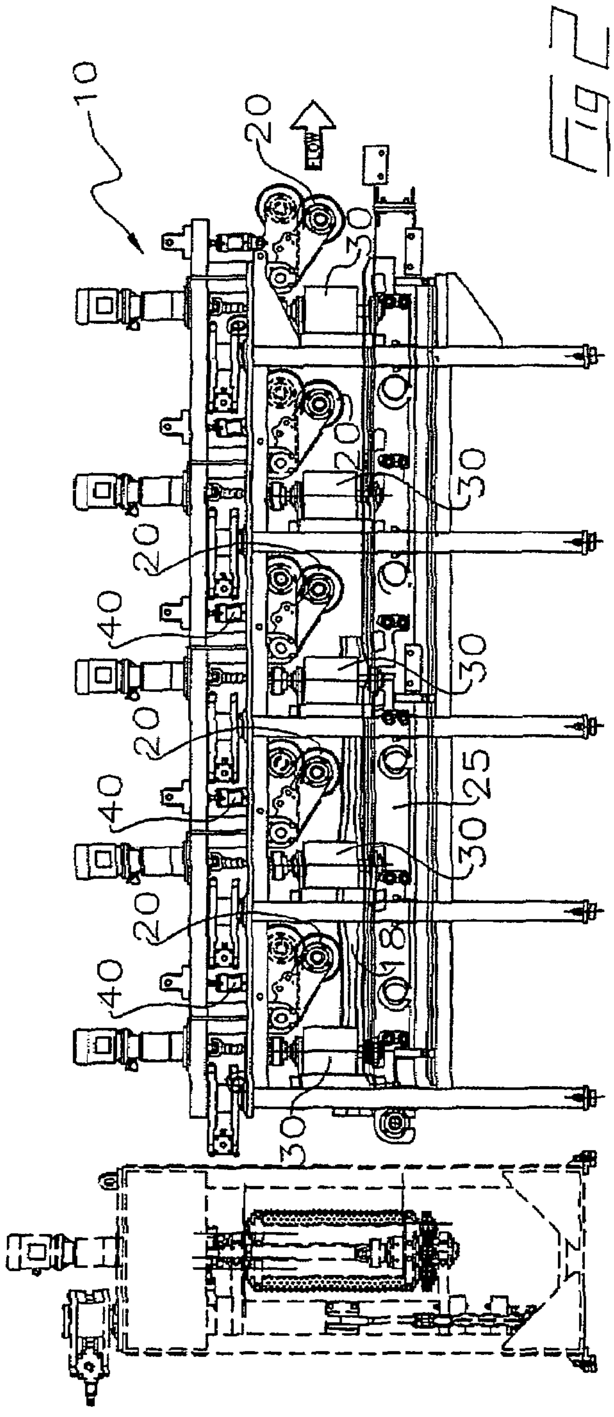
FIG. 2 is a side elevation of the sharp chain conveyor system of FIG. 1.
Figure 3:
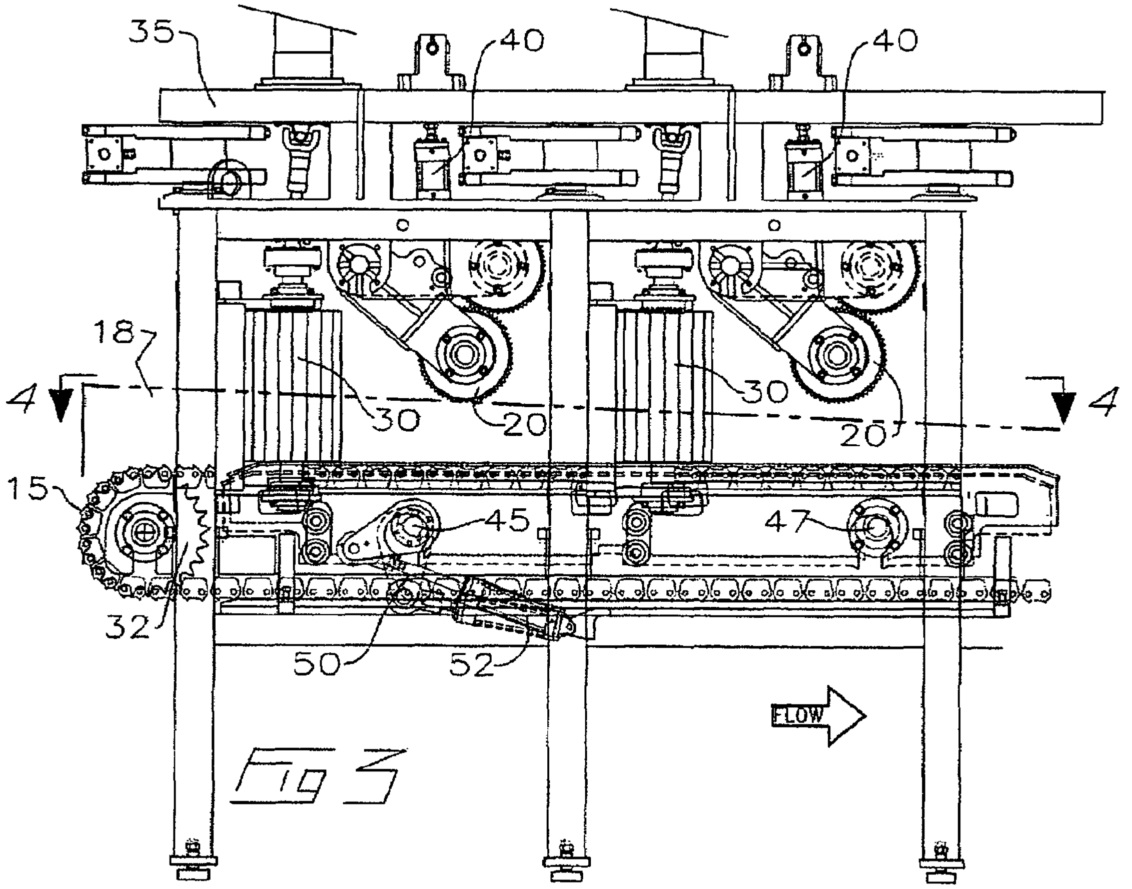
FIG. 3 is an enlarged side elevation view of the sharp chain conveyor system of FIG. 2.
Figure 4:
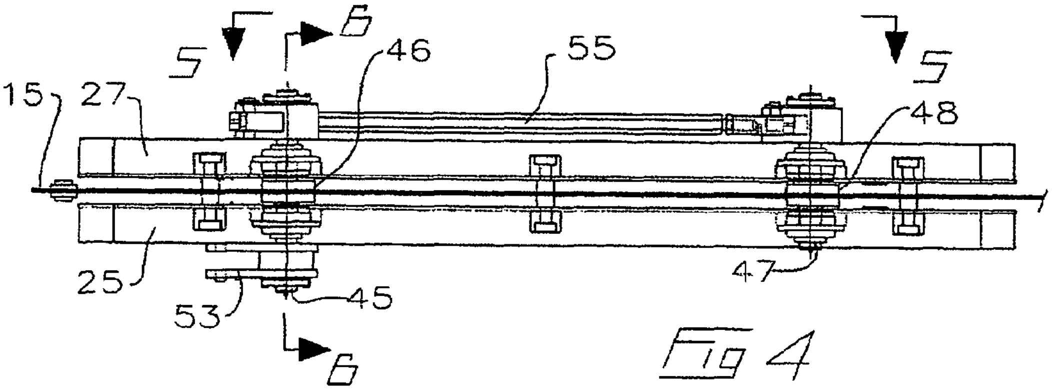
FIG. 4 is a section view along line 4-4 in FIG. 3.
Figure 9:
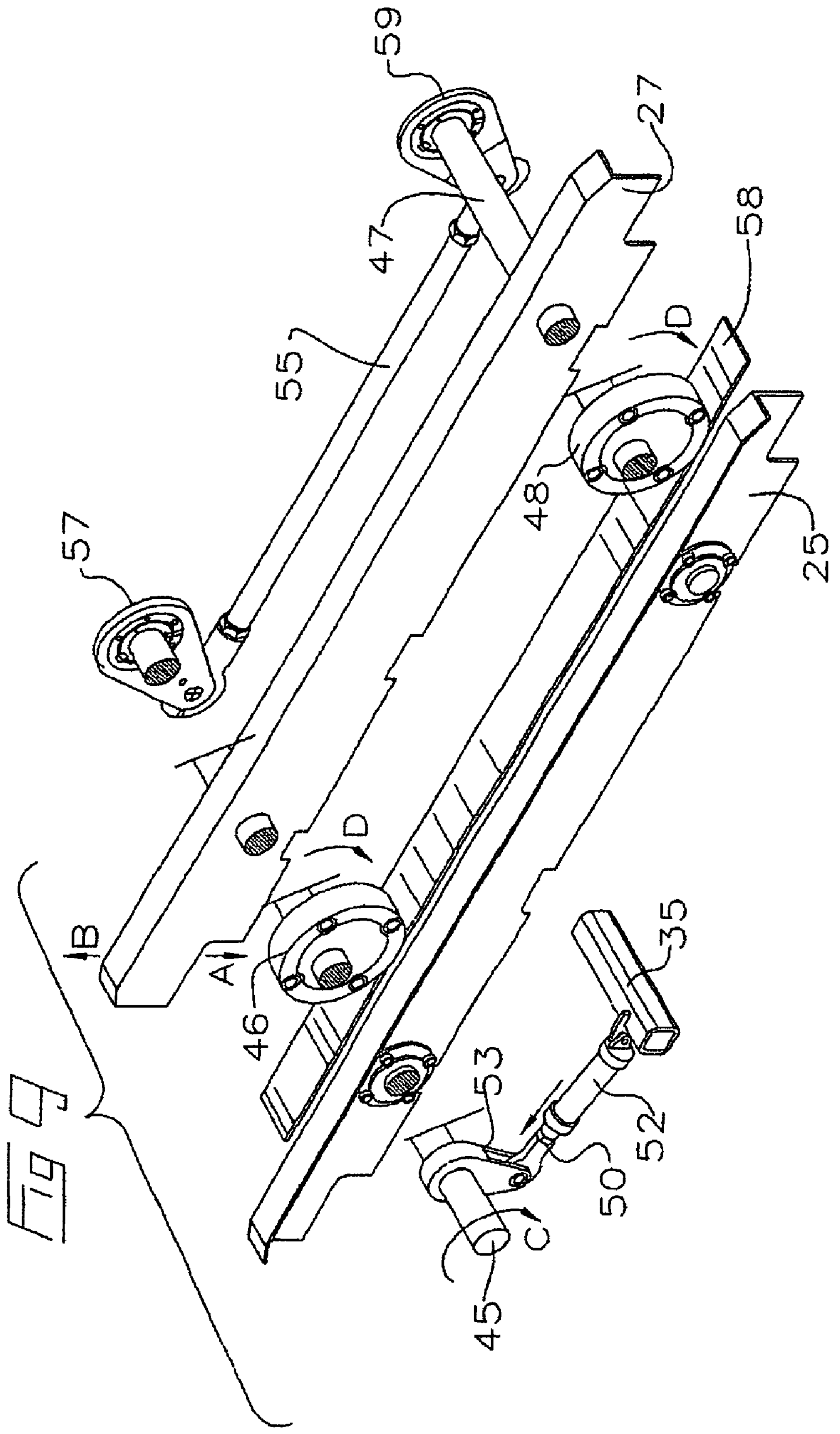

FIG. 9 is an exploded view of the first and second skid as shown in FIG. 4.

DETAILED DESCRIPTION OF EMBODIMENTS OF THE INVENTION

With reference to FIGS. 1 to 9, wherein similar characters of reference denote corresponding parts in each view, the sharp chain conveyor system 10 according to the present invention includes a conveyor such as sharp chain 15 which engages the surface of a workpiece 18. A first and a second skid 25 and 27 mounted to conveyor system 10 are configured to raise and lower workpiece 18 relative to sharp chain 15. A plurality of rotatable positioning drive rolls 30 mounted on a frame 35 rotates workpiece 18 into an optimized position.

Preferably, sharp chain 15 is a continuous steel chain. Teeth on sharp chain 15 enable sharp chain 15 to secure and engage workpiece 18 for transporting workpiece 18 along conveyor system 10 towards a primary breakdown machine, such as a headsaw (not shown). Sharp chain 15 may be mounted in one embodiment at one end on a drive sprocket 32, which is driven by suitable means known in the art to transport a workpiece 18 along conveyor system 10. The other end of the sharp chain may be mounted on an idler sprocket (not shown).

Sharp chain conveyor system 10 may further comprise a plurality of hold-down rolls 20 for maintaining workpiece 18 on sharp chain 15. Typically, hold-down rolls 20 are pivotally mounted to a frame 35 to enable hold-down rolls 20 to move towards and away from workpiece 18. Hold-down rolls 20 may be actuated by any suitable means such as pneumatically actuated cylinders 40 to engage hold-down rolls 20 with a surface of workpiece 18. Hold-down rolls 20 are usually positioned above workpiece 18 such that they may firmly contact the upper surface of workpiece 18 to maintain workpiece 18 on sharp chain 15 by way of downward pressure, as seen more clearly in FIG. 3.

First and second skids 25 and 27 are mounted in parallel alignment, one on either side of sharp chain 15 along the entire length of sharp chain conveyor system 10. First and second skids 25 and 27 are simultaneously vertically displaceable in direction A upwards and downwards in direction B between a lowered first position 28 (shown in dotted outline in FIG. 6) and an elevated second position 29, as seen in solid outline in FIG. 6. When first and second skids 25 and 27 are in lowered first position 28, first and second skids 25 and 27 are positioned below workpiece 18 such that workpiece 18 engages sharp chain 15, thereby permitting sharp chain 15 to engage the lower surface of workpiece 18. When first and second skids are in elevated second position 29, first and second skids 25 and 27 are positioned above sharp chain 15 thereby raising workpiece 18 above sharp chain 15 to permit positioning of workpiece 18.

In an embodiment of the invention, at a first end of first and second skids 25 and 27, a first through-shaft 45 is journalled through first and second skids 25 and 27. First through-shaft 45 is also journalled through a first wheel 46 disposed between first and second skids 25 and 27 such that first wheel 46 is eccentrically mounted on first through-shaft 45. Similarly, at a second end of first and second skids 25 and 27, a second through-shaft 47 is journalled through first and second skids 25 and 27. Second through-shaft 47 is also journalled through a second wheel 48 disposed between first and second skids 25 and 27 such that second wheel 48 is eccentrically mounted on second through-shaft 47. Thus rotating first and second through-shafts 45 and 47 raises or lowers skids 25 and 27 as hereinafter better described. To vertically displace first and second skids 25 and 27 between lowered first position 28 and elevated second position 29, an actuator, such as a pneumatic cylinder 52 causes first through-shaft 45 to rotate. Preferably, pneumatic cylinder 52 is coupled with frame 35 and an extendible arm 50 of pneumatic cylinder 52 is pivotably mounted to an end of first lever 53. First lever 53 is mounted on a first end of first through-shaft 45 such that when pneumatic cylinder 52 is actuated, causing extendible arm 50 to extend or retract, first lever 53 as seen in FIG. 9 causes first through-shaft 45 to rotate in a clockwise or counter-clockwise direction.

Figure 5:
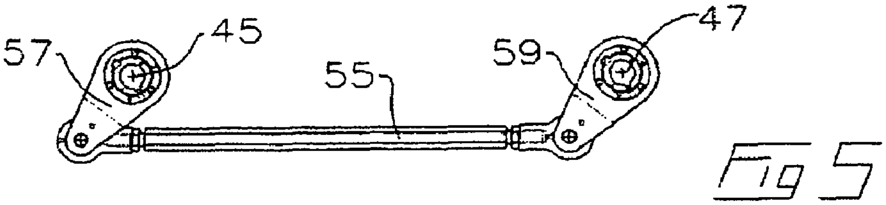
FIG. 5 is an elevation view along line 5-5 in FIG. 4.
Figure 6:
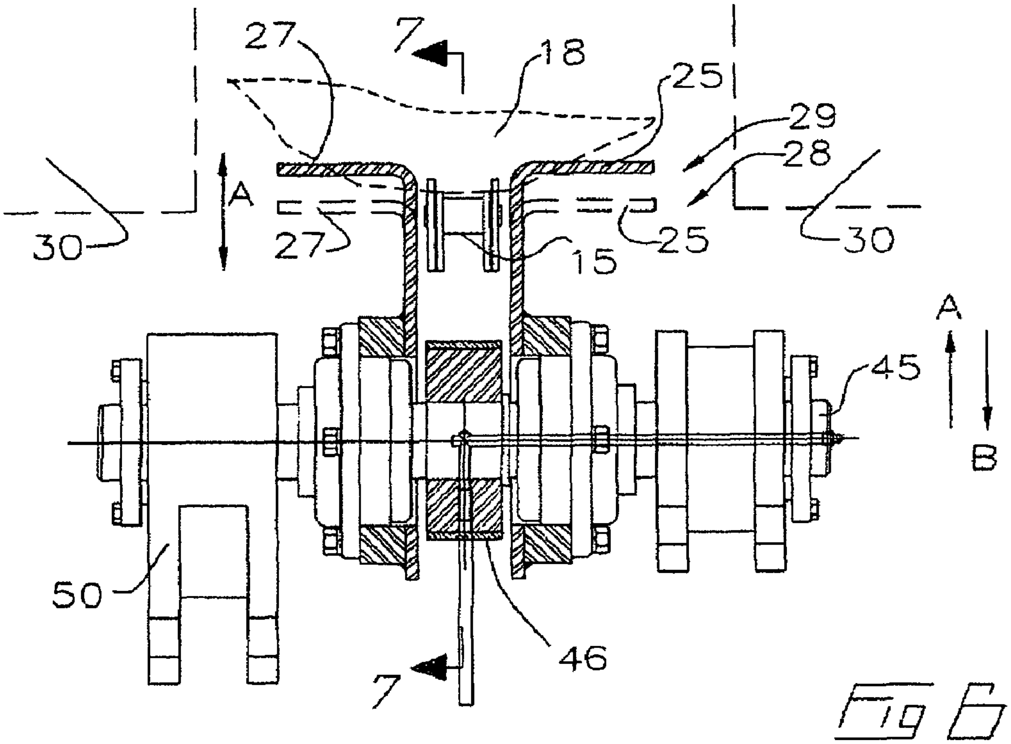
FIG. 6 is a sectional view taken on line 6-6 in FIG. 4.
Figure 7:
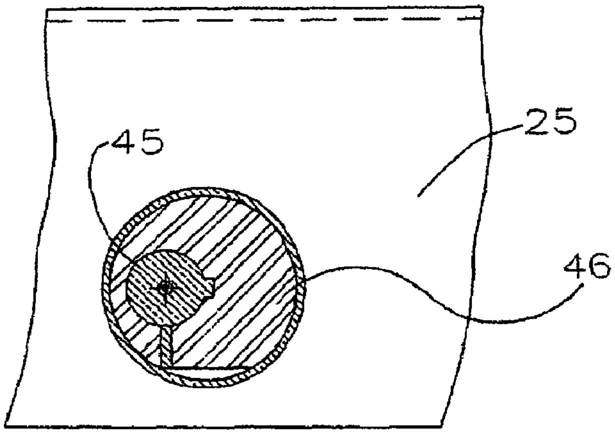
FIG. 7 is a sectional view taken on line 7-7 in FIG. 6.
Figures 6B, 6C, 6D:
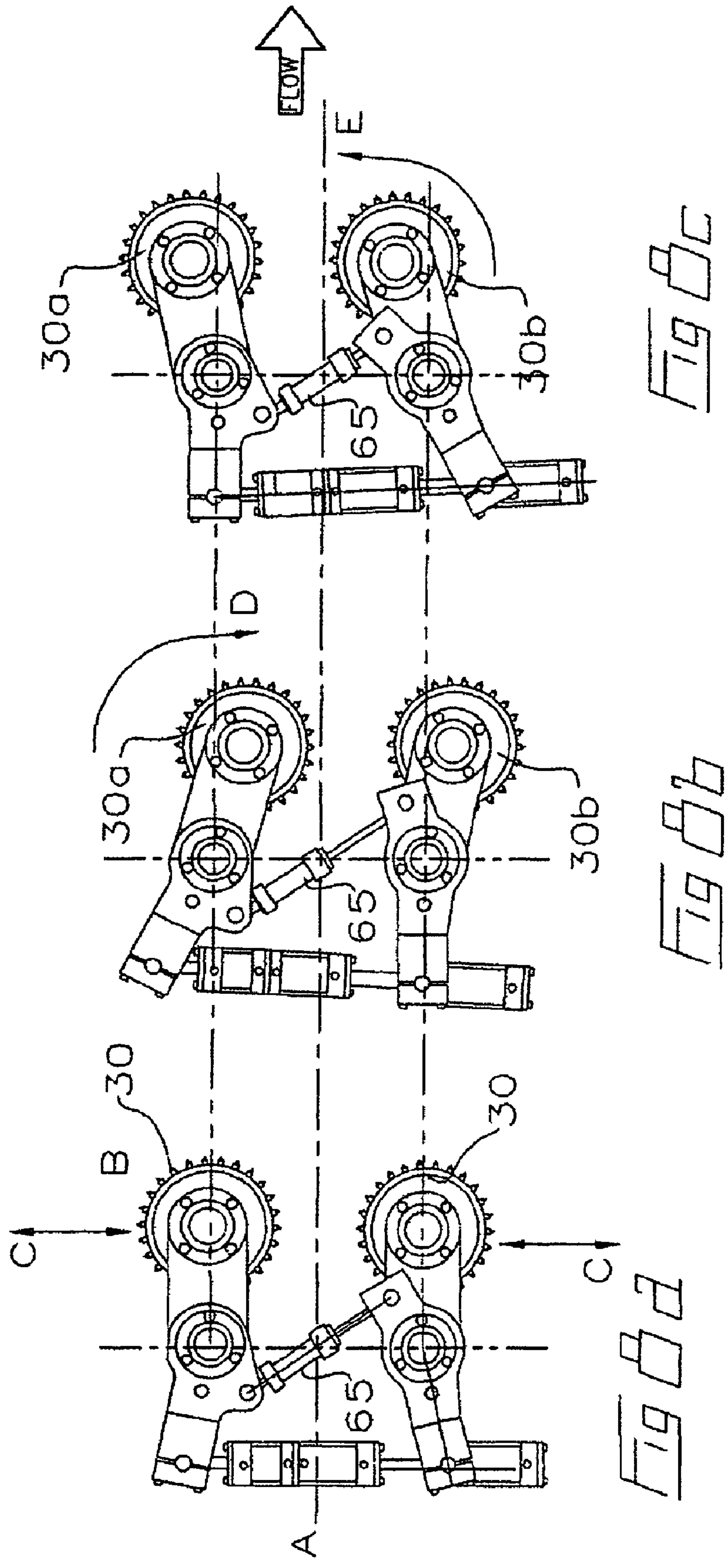

As seen in FIGS. 5 and 9, rotation of first through-shaft 45 also rotates second through-shaft 47 by driving member 55. At a first end, member 55 is pivotably coupled with a first end of a second lever 57 and at second end, member 55 is pivotably coupled with a first end of third lever 59. A second end of second lever 57 is mounted on a second end of first through-shaft 45 and a second end of third lever 59 is mounted on an end of second through-shaft 47 such that when pneumatic cylinder 52 is actuated, first lever 53 causes first through-shaft 45 to rotate, thereby displacing second lever 57 mounted on the second end of first through-shaft 45. Second lever 57 converts the rotary motion of first through-shaft 45 into reciprocating motion, thereby driving member 55 to displace third lever 59. Member 55 therefore transfers rotational movement of first through-shaft 45 to rotate second through-shaft 47 by displacing third lever 59, which causes second through-shaft 47 to rotate, resulting in the uniform vertical displacement of first and second skids 25 and 27 presuming that wheels 46 and 48 are uniformly eccentrically mounted on shafts 45 and 47. More particularly, as seen in FIG. 9, extension of extendible arm 50 causes first lever 53 to displace, causing first through-shaft 45 to rotate in a clockwise direction C. Rotation of first through-shaft 45 displaces second lever 57, thereby driving member 55 and causing third lever 59 to displace and rotate second through-shaft 47. Rotation of first-through shaft 45 and second through-shaft 47 causes first wheel 46 and second wheel 48 to rotate in direction D. As first wheel 46 and second wheel 48 rotate in direction D, first wheel 46 and second wheel 48 exerts downward pressure on frame member 58 of frame 35, best seen in FIG. 9, thereby elevating first through-shaft 45 and second through-shaft 47, causing first and second skids 25 and 27 to vertically displace from lowered first position 28 to elevated second position 29. Retraction of extendible arm 50 therefore causes first lever 53, second lever 57, and third lever 59 to rotate first through-shaft 45 and second through-shaft 47 in a counter-clockwise direction, thereby causing first wheel 46 and second wheel 48 to rotate oppositely to direction D, thereby lowering first through-shaft 45 and second through-shaft 47 such that first and second skids 25 and 27 may vertically displace from elevated second position 29 to lowered first position 28.

Preferably, pairs of rotatable positioning drive rolls 30 are positionable along the length of sharp chain conveyor system 10 such that one positioning drive roll 30 of each pair is positioned on each side of sharp chain 15, as best seen in FIGS. 8*a* to 8*c*. Although illustrated as having a spiked outer surface, it is understood that the outer surface of drive rolls 30 may also be fluted or otherwise adapted to grip the outer surface of workpiece 18, preferably without marring of the workpiece surface. Typically, rotatable positioning drive rolls 30 are vertically oriented and pivotally coupled to frame 35 to assist in both the transport and positioning of workpiece 18. To laterally and angularly displace workpiece 18 relative to the longitudinal centreline of sharp chain 15, rotatable positioning drive rolls 30 may be selectively brought into contact with the surface of workpiece 18. Rotatable positioning drive rolls 30 may cooperate as a pair to move workpiece 18 laterally towards and away from the longitudinal centreline of workpiece 18, as shown by arrow C. Each rotatable positioning drive roll 30*a* and 30*b* of each pair of rotatable positioning drive rolls 30 may also independently move angularly towards and away from the longitudinal centreline of workpiece 18, as shown by arrows D and E. To control the movement of rotatable positioning drive rolls 30, actuator means, such as a hydraulic cylinder 65 may be provided to operate each pair of rotatable positioning drive rolls 30.

To position workpiece 18, pneumatic cylinder 52 actuates rotation of first and second through-shafts 45 and 47 in a first direction, causing skids 25 and 27 to vertically displace upwards to elevated second position 29. Workpiece 18 is thereby elevated and disengages from sharp chain 15 to be rotated by rotatable positioning drive rolls 30. Hydraulic cylinder 65 moves rotatable positioning drive rolls 30 such that rotatable positioning drive rolls 30 engage the surface of workpiece 18.

As seen in FIG. 8*a*, if the optimized position for workpiece 18 is to position workpiece 18 such that the longitudinal centreline of workpiece 18 may be laterally displaced relative to the longitudinal centreline A of sharp chain 15, hydraulic cylinder 65 cooperatively moves rotatable positioning drive rolls 30 in the direction of arrow C to position workpiece 18. Rotatable positioning drive rolls 30 may be positioned equidistant from the longitudinal centreline A of sharp chain 15 such that the longitudinal centreline of workpiece 18 may be positioned generally in parallel with the centreline A of sharp chain 15.

As seen in FIG. 8*b*, if the optimized position for workpiece 18 is to angularly displace workpiece 18 such that the longitudinal centreline of workpiece 18 is skewed to the right relative to longitudinal centreline A of sharp chain 15, hydraulic cylinder 65 independently moves one of the rotatable positioning drive rolls 30 to angularly/laterally position workpiece 18 according to the optimized position. To skew or angularly position workpiece 18 to the right of the longitudinal centreline A of sharp chain 15, hydraulic cylinder 65 independently moves rotatable positioning drive rolls 30*a* in the direction of arrow D to urge workpiece 18 to the right and hydraulic cylinder 65 extends to independently move positioning drive roll 30*b* to cooperate with the angular displacement of workpiece 18 wherein the pivot shaft may be referenced as a datum.

As seen in FIG. 8*c*, if the optimized position for workpiece 18 is to angularly displace workpiece 18 such that the longitudinal centreline of workpiece 18 is skewed to the left relative to longitudinal centreline A of sharp chain 15, hydraulic cylinder 65 independently moves rotatable positioning drive rolls 30 to angularly/laterally position workpiece 18 according to the optimized position. To skew or angularly position workpiece 18 to the left of the longitudinal centreline A of sharp chain 15, hydraulic cylinder 65 independently moves rotatable positioning drive roll 30*b* in the direction of arrow E to urge workpiece 18 to the left and hydraulic cylinder 65 retracts to independently move rotatable positioning drive roll 30*a* to cooperate with the angular displacement of workpiece 18.

Once workpiece 18 is in the optimized position, pneumatic cylinder 52 actuates rotation of first and second through-shafts 45 and 47 in a second direction, causing skids 25 and 27 to vertically displace downwards to lowered first position 28. Pneumatic cylinder 65 moves rotatable positioning drive rolls 30 such that rotatable positioning drive rolls 30 disengage from the curved surface of workpiece 18 and workpiece 18 re-engages with the teeth of sharp chain 15 in the optimized position. Hold-down rolls 20 engage workpiece 18 to hold workpiece 18 on sharp chain 15 by way of downward pressure.

The present invention is intended to be included within a larger lumber processing system for example as used in sawmills. It is contemplated and within the scope of the present invention that workpiece 18 may be processed prior to being fed onto sharp chain conveyor system 10. For example, rotatable positioning drive rolls 30 may displace in response to a signal sent from a scanner and optimizer which scanned and optimized workpiece 18 prior to workpiece 18 being placed on sharp chain conveyor 10. Such signal is transmitted by conventional means such as a conductor cable from the scanner and optimizer to be received by motion controllers which control hydraulic cylinders 65 to independently or cooperatively actuate rotatable positioning drive rolls 30 to position workpiece 18 according to the optimized position determined by the scanner and optimizer. Preferably, the scanner and optimizer forms a part of sharp chain conveyor system 10.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A conveyor system for transporting a workpiece, the system comprising:

a conveyor having a single continuous sharp chain for engaging a first surface of the workpiece;

a first and a second skid coupled by a first and second through-shaft passing through said first and said second skid, the first and second skid mounted in parallel alignment with said conveyor and selectively actuable so as to provide uniform vertical displacement of said first and said second skid between a lowered first position wherein the workpiece is in contact with said conveyor, and an elevated second position wherein the workpiece is elevated above said conveyor, said first and said second skid remaining parallel to said conveyor in both the lowered first position and in the elevated second position;

a lift mechanism disposed between the first and second skid, the lift mechanism coupled to the first and second through-shafts and configured to lift the first and second through-shafts; and a plurality of rotatable positioning drive rolls mounted along said conveyor, said plurality of rotatable positioning drive rolls for rotating and/or positioning the workpiece when the workpiece is displaced by said first and said second skids into said second position;

wherein each of said first and second skid and plurality of rotatable positioning drive rolls are positioned along the single continuous sharp chain.

2. The conveyor system of claim 1 further comprising a plurality of hold-down rolls, said plurality of hold-down rolls exerting downward pressure on the workpiece to maintain the workpiece on said conveyor.

3. The conveyor system of claim 2 wherein said plurality of hold-down rolls are pivotally coupled with a frame such that said plurality of hold-down rolls may move towards and away from the workpiece to engage a second surface of the workpiece.

4. The conveyor system of claim 3 wherein said conveyor comprises a continuous sharp chain having a plurality of teeth, said teeth engaging said first surface of the workpiece.

5. The conveyor system of claim 4 wherein said first skid is positionable along a first side of said sharp chain and said second skid is positionable along a second side of said sharp chain such that said sharp chain is interposed between said first and said second skid.

6. The conveyor system of claim 5 wherein when the workpiece is displaced to said lowered first position, said first and said second skid displaces vertically downwards relative to said sharp chain such that the workpiece engages said sharp chain.

7. The conveyor system of claim 6 wherein when the workpiece is displaced to said elevated second position, said first and said second skid displaces vertically upwards relative to said sharp chain such that the workpiece is elevated and disengages from said sharp chain.

8. The conveyor system of claim 7 further comprising a first wheel disposed between a first end of said first and said second skid and a second wheel disposed between a second end of said first and said second skid wherein the first through-shaft journals through said first and said second skid and said first wheel at a first end and the second through-shaft journals through said first and said second skid and said second wheel at a second end such that said first and said second wheels are eccentrically mounted on said first and said second through-shaft.

9. The conveyor system of claim 8 further comprising a member pivotally coupled with said first through-shaft and said second through-shaft such that when a first actuating means rotates said first though shaft, said member transfers rotational movement of said first through-shaft to rotate said second through-shaft.

10. The conveyor system of claim 9 wherein when said member transfers rotational movement of said first through-shaft to said second through-shaft, said first and said second wheel causes said first and said second skid to displace uniformly between said first position and said second position.

11. The conveyor system of claim 10 wherein said plurality of rotatable positioning drive rolls comprise pairs of said rotatable positioning drive rolls positionable along said sharp chain such that one rotatable positioning drive roll from each pair of rotatable positioning drive rolls is positionable on each side of said sharp chain.

12. The conveyor system of claim 11 wherein said pairs of rotatable positioning drive rolls are pivotally coupled with said frame such that said pairs of rotatable positioning drive rolls displace laterally towards and away from a longitudinal centreline of the workpiece and displace angularly relative to said longitudinal centreline of the workpiece.

13. The conveyor system of claim 12 wherein a second actuating means laterally displace said pairs of rotatable positioning drive rolls relative to said longitudinal centreline of the workpiece to engage the workpiece such that said actuating means cooperatively move said pair of rotatable positioning drive rolls to displace the workpiece laterally relative to said longitudinal centreline of said sharp chain.

14. The conveyor system of claim 13 wherein said second actuating means angularly displace one rotatable positioning drive roll of said pair of rotatable positioning drive rolls relative to said longitudinal centreline of the workpiece such that said actuating means independently move each of said rotatable positioning drive rolls to displace the workpiece angularly relative to said longitudinal centreline of said sharp chain.

15. The conveyor system of claim 14 further comprising a scanner and optimizer wherein said scanner and optimizer determines an optimized position for the workpiece, said scanner and optimizer in transmittable communication with said second actuating means to control said pairs of rotatable positioning drive rolls to position the workpiece in said optimized position.

16. The conveyor system of claim 15 wherein said optimizer is in transmittable communication with said first actuating means to control said first and said second skid to elevate the workpiece to enable said pairs of rotatable positioning drive rolls to position the workpiece in said optimized position.

17. The conveyor system of claim 1, wherein at least one of said plurality of rotatable positioning drive rolls is configured to be independently displaceable relative to said conveyor.

18. A conveyor system for transporting a workpiece, the system comprising:

a single continuous sharp chain having a plurality of teeth to engage a first surface of the workpiece;

a plurality of hold-down rolls pivotally coupled with a frame such that said plurality of hold-down rolls engage the workpiece to maintain the workpiece on said sharp chain by exerting downward pressure on the workpiece;

a first and a second skid positionable in parallel alignment with said sharp chain such that said sharp chain is interposed between said first and said second skid, said first and said second skid adapted to uniformly vertically displace the workpiece between a lowered first position and an elevated second position, wherein the first and the second skid remain in parallel alignment with said sharp chain in both the lowered first position and in the elevated second position;

a first wheel disposed between a first end of said first and said second skid and a second wheel disposed between a second end of said first and said second skid;

a first through-shaft journaling through said first and said second skid and said first wheel at a first end and a second through-shaft journaling through said first and said second skid and said second wheel at a second end such that said first and said second wheels are eccentrically mounted on said first and said second through-shaft;

a member pivotably coupled with said first through-shaft and said second through-shaft such that when a first actuating means rotates said first though-shaft, said member transfers rotational movement of said first through-shaft to rotate said second through-shaft; and pairs of rotatable positioning drive rolls positionable along said sharp chain such that one rotatable positioning drive roll from each pair of rotatable positioning drive rolls is positionable on each side of said sharp chain, said pairs of rotatable positioning drive rolls pivotally coupled with said frame such that said pairs of rotatable positioning drive rolls displace laterally towards and away from a longitudinal centreline of the workpiece and displace angularly relative to said longitudinal centreline of the workpiece, the rotatable positioning drive rolls configured to position the workpiece when said first and second skid are in said second elevated position, wherein each of said hold-down rolls, first and second skid, and pairs of rotatable positioning drive rolls are positioned along the single continuous sharp chain.

19. The conveyor system of claim 18 wherein when said member transfers rotational movement of said first through-shaft to said second through-shaft, said first and said second wheel causes said first and said second skid to displace uniformly between said first position and said second position.

20. The conveyor system of claim 19 wherein a second actuating means laterally displace said pair of rotatable positioning drive rolls relative to said longitudinal centreline of the workpiece to engage the workpiece such that said actuating means cooperatively move said pair of rotatable positioning drive rolls to displace the workpiece laterally relative to said longitudinal centreline of said sharp chain.

21. The conveyor system of claim 20 wherein said second actuating means angularly displace one rotatable positioning drive roll of said pair of rotatable positioning drive rolls relative to said longitudinal centreline of the workpiece such that said actuating means independently move each of said rotatable positioning drive rolls to displace the workpiece angularly relative to said longitudinal centreline of said sharp chain.

22. The conveyor system of claim 18, wherein at least one of said pairs of rotatable positioning drive rolls comprises a first and a second rotatable positioning drive roll, the first rotatable positioning drive roll configured to be angularly displaceable independently of the second rotatable positioning drive roll.

* * * * *

UNITED STATES PATENT AND TRADEMARK OFFICE

CERTIFICATE OF CORRECTION

PATENT NO. : 7,631,748 B2
APPLICATION NO. : 11/326346
DATED : December 15, 2009
INVENTOR(S) : Rory M. Mitchell It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 577 days.

Signed and Sealed this

Second Day of November, 2010

David J. Kappos

*Director of the United States Patent and Trademark Office*

UNITED STATES PATENT AND TRADEMARK OFFICE

CERTIFICATE OF CORRECTION

PATENT NO. : 7,631,748 B2
APPLICATION NO. : 11/326346
DATED : December 15, 2009
INVENTOR(S) : Rory M. Mitchell It is certified that error appears in the above-identified patent and that said Letters Patent is hereby corrected as shown below:

IN THE CLAIMS:

Column 8, Claim 1,
Line 13, "...said second position;..." should read --...said second position,....--.

Column 8, Claim 9,
Line 57, "...first though shaft,..." should read --...first through-shaft,....--.

Column 10, Claim 18,
Line 13, "...first though-shaft,..." should read --...first through-shaft,....--.

Signed and Sealed this
Thirty-first Day of May, 2011

David J. Kappos
*Director of the United States Patent and Trademark Office*